(12) United States Patent
Wusirika

(10) Patent No.: US 7,473,392 B2
(45) Date of Patent: Jan. 6, 2009

(54) LOW CTE CORDIERITE BODY AND METHODS OF MANUFACTURING SAME

(75) Inventor: Raja Rao Wusirika, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/906,625

(22) Filed: Oct. 3, 2007

(65) Prior Publication Data

US 2008/0085393 A1 Apr. 10, 2008

Related U.S. Application Data

(62) Division of application No. 11/141,784, filed on May 31, 2005, now Pat. No. 7,300,898.

(51) Int. Cl.
*B28B 21/52* (2006.01)

(52) U.S. Cl. ...................... 264/631; 264/630

(58) Field of Classification Search .................. 264/631
See application file for complete search history.

(56) References Cited

U.S. PATENT DOCUMENTS

| | | | |
|---|---|---|---|
| 3,885,977 A | 5/1975 | Lachman et al. | 106/62 |
| 4,434,117 A | 2/1984 | Inoguchi et al. | 264/56 |
| 5,114,643 A | 5/1992 | Beall et al. | 264/63 |
| 5,114,644 A | 5/1992 | Beall et al. | 264/63 |
| 5,141,686 A | 8/1992 | Murtagh | 264/56 |
| 5,258,150 A | 11/1993 | Merkel et al. | 264/43 |
| 5,409,870 A | 4/1995 | Locker et al. | 501/119 |
| 5,552,349 A | 9/1996 | Ichii et al. | 501/9 |
| 5,607,885 A | 3/1997 | Ichii et al. | 501/9 |
| 6,087,281 A | 7/2000 | Merkel | 501/9 |
| 6,214,437 B1 | 4/2001 | Beall et al. | 428/116 |
| 6,284,693 B1 | 9/2001 | Beall et al. | 501/119 |
| 6,391,813 B1 | 5/2002 | Merkel | 501/119 |
| 6,432,856 B1 | 8/2002 | Beall et al. | 501/118 |
| 6,541,407 B2 | 4/2003 | Beall et al. | 501/119 |
| 6,589,465 B2 | 7/2003 | Kumazawa et al. | 264/177.12 |
| 6,773,657 B2 | 8/2004 | Beall et al. | 264/628 |
| 6,800,107 B2 | 10/2004 | Ishihara et al. | 55/523 |
| 6,814,774 B2 | 11/2004 | Ishihara et al. | 55/523 |
| 6,864,198 B2 | 3/2005 | Merkel | 501/80 |
| 2005/0215417 A1 | 9/2005 | Teratani et al. | 501/119 |

*Primary Examiner*—Eric Hug
*Assistant Examiner*—Russell J Kemmerle, III
(74) *Attorney, Agent, or Firm*—Joseph M. Homa

(57) ABSTRACT

Disclosed is a sintered ceramic article that exhibits a primary crystalline phase of cordierite having an analytical oxide composition, expressed in weight percent on an oxide basis, of 49-53% $SiO_2$, 33-38% $Al_2O_3$, 12-16% MgO and which exhibits a coefficient of thermal expansion equal to or more negative than $-0.6 \times 10^{-7}/°$ C. over the temperature range of about 25° C. to about 800° C. Also disclosed is a method for producing a ceramic article comprising the aforementioned cordierite.

10 Claims, 1 Drawing Sheet

US 7,473,392 B2

LOW CTE CORDIERITE BODY AND METHODS OF MANUFACTURING SAME

This is a divisional of U.S. patent application Ser. No. 11/141,784, now U.S. Pat. No. 7,300,898, filed on May 31, 2005, the content of which is relied upon and incorporated herein by reference in its entirety, and the benefit of priority under 35 U.S.C. § 120 is hereby claimed.

BACKGROUND OF THE INVENTION

1. Field of the Invention

The present invention is directed to a cordierite ceramic body for use as a catalyst carrier, and particularly to cordierite bodies having high thermal shock resistance by virtue of their low coefficient of thermal expansion (CTE).

2. Technical Background

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of pollutants from automobile engine systems, the first automobiles equipped with catalytic converters having been introduced in the mid 1970's.

Cordierite substrates, typically in the form of a honeycomb body, have long been preferred for use as substrates to support catalytically active components for catalytic converters on automobiles, in part due to cordierite ceramics' high thermal shock resistance. The thermal shock resistance is inversely proportional to the coefficient of thermal expansion. That is, honeycombs with a low thermal expansion have a good thermal shock resistance and can survive the wide temperature fluctuations that are encountered in the application. It is generally known that the coefficient of thermal expansion of cordierite bodies is about $18 \times 10^{-7}/°$ C. in the range of $25°$ C.-$800°$ C. for those polycrystalline cordierite bodies in which the cordierite crystals are randomly oriented.

The production of cordierite ($2MgO.2Al_2O_3.5SiO_2$) ceramics from mineral batches containing sources of magnesium, aluminum and silicon such as clay and talc is well known. Such a process is described in U.S. Pat. No. 5,258, 150. U.S. Pat. No. 3,885,977 discloses the manufacture of thermal-shock-resistant cordierite honeycomb ceramics from clay/talc batches by extruding the batches and firing the extrudate to provide ceramics with very low expansion coefficients along at least one direction. Furthermore, this reference describes the principle of orienting the cordierite crystals with their crystallographic c-axis in the plane of the honeycomb webs, resulting in thermal expansion values as low as $5.5 \times 10^{-7}/°$ C.

Manufacturers work continuously to optimize the characteristics of cordierite substrates to enhance their utility as catalyst carriers. Specifically, manufacturers continually strive to optimize the thermal shock resistance and strength of the cordierite substrates. The following patents each relate to the manufacture of ceramic honeycombs exhibiting improved thermal shock resistance or coefficient of thermal expansion (CTE).

U.S. Pat. No. 4,434,117 (Inoguchi et al.) discloses the use of a raw material mixture comprising plate-shaped talc particles and non-plate shaped particles of other ceramic materials and thereafter anisostatically forming the mixed batch so as to impart a planar orientation to the plate-shaped talc particles and then drying and firing to obtain a formed ceramic body. The ceramic bodies formed in the Inoguchi reference exhibited thermal expansion coefficients as low as $7.0 \times 10^{-7}/°$ C.

U.S. Pat. No. 5,114,643 (Beall et al.) and U.S. Pat. No. 5,114,644 (Beall et al.) disclose a method of fabricating a cordierite body involving selecting specific raw materials that will form the desired cordierite body. Specifically, these raw material selections should not include any clay or talc, should include a MgO-yielding component and an $Al_2O_3$-yielding component having a particle size of no greater than 15 and 8 μm, respectively. The raw materials are mixed together, subsequently dried and fired for a time and a temperature sufficient to form the aforementioned cordierite body. The ceramic bodies formed by these Beall references exhibited thermal expansion coefficients of less than about $9 \times 10^{-7}/°$ C. from about 25 to about $1000°$ C.

While such ceramics represent an improvement in the thermal expansion coefficient properties over extruded cordierite ceramics produced using pre-existing processes, still further improvements in this thermal expansion characteristic, particularly without a measurable reduction in the ceramics' strength would be desirable. Strength has become an increasingly important consideration in the production of cordierite honeycomb substrates as a result of the move to producing thinner-walled, higher cell density, increased catalytic conversion efficiency and lower back pressure cordierite honeycomb catalyst carriers.

It is therefore a principal objective of the present invention to provide improved cordierite ceramics, and method for making them, that exhibit adequate strength in combination with an ultra-low thermal expansion.

SUMMARY OF THE INVENTION

The present invention provides a sintered ceramic substrate and methods for making the ceramic substrate, having a primary crystalline phase comprising cordierite and exhibiting an ultra-low coefficient of thermal expansion.

In a first aspect, the present invention provides a ceramic article, comprising a sintered phase composition comprising at least about 93% by weight cordierite, wherein the cordierite consists essentially of from about 49 to about 53 percent by weight $SiO_2$, from about 33 to about 38 percent by weight $Al_2O_3$, and from about 12 to about 16 percent by weight MgO, and wherein the sintered phase composition exhibits a coefficient of thermal expansion in the axial direction equal to or more negative than $-0.6 \times 10^{-7}/°$ C. across the temperature range of from $25°$ C. to $800°$ C.

In a second aspect, the present invention provides a method for producing a ceramic article comprising a sintered phase cordierite composition. The method comprises the steps of mixing a dispersible alumina source and a magnesium oxide source in a solvent to provide a slurry premix; substantially removing the solvent from the slurry premix to provide a first dry premix; mixing at least one silica source together with the first dry premix to provide a cordierite precursor batch composition; mixing the cordierite precursor batch composition together with a binder system to form a plasticized cordierite precursor composition; forming a green body from the plasticized cordierite precursor composition; and firing the green body for a period of time and at a temperature sufficient to provide a ceramic article comprising a cordierite composition.

In a third aspect, the present invention provides a ceramic article produced by the methods of the present invention.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention.

DETAILED DESCRIPTION OF THE INVENTION

Figure 1:
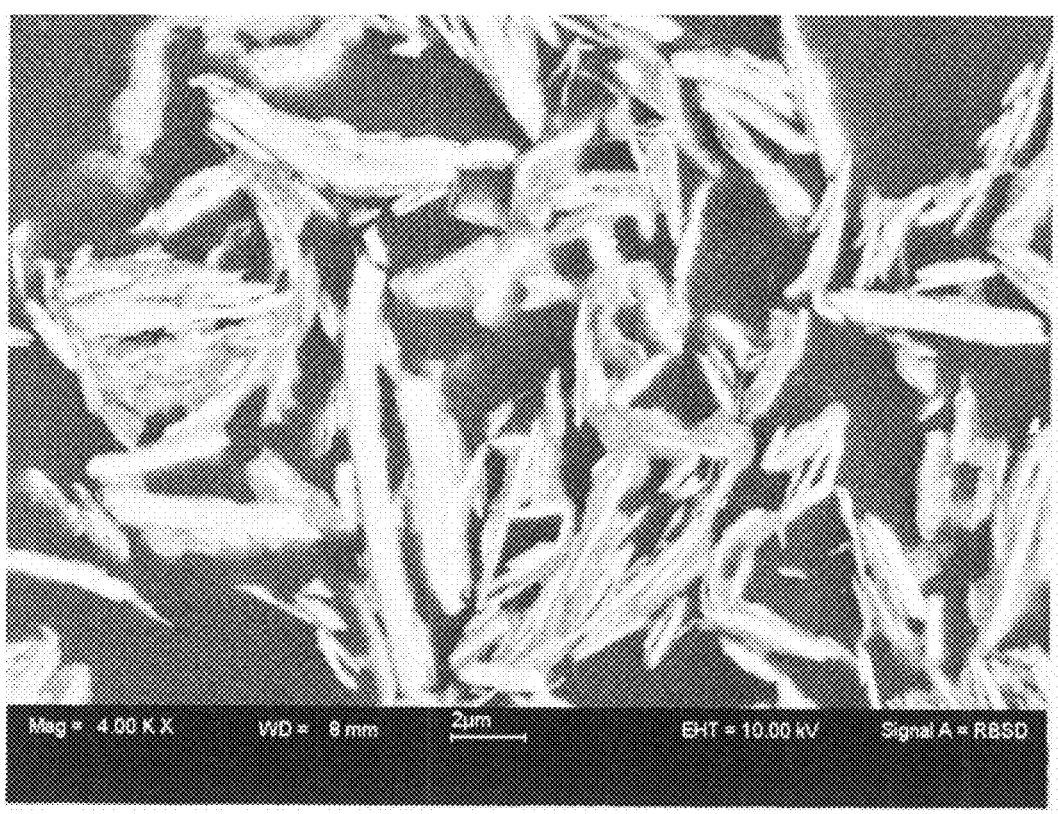
FIG. 1 is an SEM micrograph of a spray dried premix slurry according to one aspect of the present invention.

The present invention can be understood more readily by reference to the following detailed description, examples, and claims, and their previous and following description.

Before the present compositions, devices, and/or methods are disclosed and described, it is to be understood that this invention is not limited to the specific articles, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "dispersible alumina forming source" includes aspects having two or more such dispersible alumina forming sources unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

As used herein, a "weight percent" or "percent by weight" of a component, unless specifically stated to the contrary, is based on the total weight of the formulation or composition in which the component is included.

As used herein, the term "more negative than" refers to a number or value that is further away from zero in the negative direction. For example, and without limitation, a mean coefficient of thermal expansion of $-1.0 \times 10^{-7}/°$ C. across the temperature range of from 25° C. to 800° C. is more negative than a mean coefficient of thermal expansion of $-0.6 \times 10^{-7}/°$ C. across the temperature range of from 25° C. to 800° C.

Throughout this application various publications are referenced. It should be understood that the disclosures of these publications in their entireties are hereby incorporated by reference into this application for all purposes.

As briefly stated above, the present invention relates to ceramic articles and to a method of producing these articles. As will be described below, the inventive ceramic articles can be formed from a plasticized cordierite precursor batch mixture comprised of raw materials wherein the relative amounts of each raw material is selected to form a ceramic article comprising a sintered phase composition comprising at least about 93% by weight cordierite. The cordierite consists essentially, on an analytical oxide basis, of from about 49 to about 53 percent by weight $SiO_2$, from about 33 to about 38 percent by weight $Al_2O_3$, and from about 12 to about 16 percent by weight MgO.

In accordance with one aspect of the present invention, provided is a plasticizable cordierite precursor batch composition for use in preparing the ceramic articles of the instant invention. In one aspect, the plasticizable cordierite precursor batch composition comprises at least one dispersible alumina source, at least one magnesium oxide source, and at least one silica source.

The magnesium oxide source can in one aspect comprise talc. In one aspect, the talc can be a platy talc. As used herein, a platy talc refers to talc that exhibits a platelet particle morphology, i.e., particles having two long dimensions and one short dimension, or, for example, a length and width of the platelet that is much larger than its thickness. In one aspect, the talc possess a morphology index greater than about 0.75. The morphology index, as disclosed in U.S. Pat. No. 5,141, 686, is a measure of the degree of platiness of the talc. One typical procedure for measuring the morphology index is to place the sample in a holder so that the orientation of the platy talc is maximized within the plane of the sample holder. The x-ray diffraction (XRD) pattern can then be determined for the oriented talc. The morphology index semi-quantitatively relates the platy character of the talc to its XRD peak intensities using the following equation:

$$M = \frac{I_x}{I_x + 2I_y}$$

where $I_x$ is the intensity of the peak and $I_y$ is that of the reflection. Examples of commercially available magnesium oxide sources suitable for use in the present invention include, without limitation, Arctic Mist Talc, available from Luzenac, Inc. of Oakville, Ontario, Canada, and 96-67 Talc available from Barrett's Minerals, Inc. of Dillon, Mont.

As used herein, the term alumina-forming source refers to an aluminum oxide or a compound containing aluminum which when heated to sufficiently high temperature yields essentially 100% aluminum oxide. Thus, a dispersible alumina forming source is an alumina forming source that is at least substantially dispersible in a solvent or liquid medium and that can be used to provide a colloidal suspension in a solvent or liquid medium. In one aspect, a dispersible alumina source can be a relatively high surface area alumina source having a specific surface area of at least 20 m²/g. Alternatively, a dispersible alumina source can have a specific surface area of at least 50 m²/g. In one aspect, a dispersible alumina source comprises alpha aluminum oxide hydroxide (AlOOH.x.H₂O) commonly referred to as boehmite, pseudo-boehmite, and as aluminum monohydrate. In another aspect, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities. Examples of commercially available dispersible alumina sources that can be used in the present invention include, without limitation, Dispal Boehmite, commercially available from CONDEA Vista Company of Houston, Tex., and Alpha Alumina A1000, commercially available from Almatis, Inc.

While the dispersible alumina can be used in any amount sufficient to enable the formation of a cordierite body as described herein, in one aspect, the dispersible alumina is used in an amount in the range of from approximately 15 to approximately 45 weight percent relative to the total weight of the cordierite precursor batch composition, including without limitation such exemplary weight percentages of 20 weight percent, 25 weight percent, 30 weight percent, 35 weight percent, 40 weight percent, and any range derived from these values.

The silica forming source can in one aspect comprises a silica raw material including fused $SiO_2$; colloidal silica; crystalline silica, such as quartz or cristobalite, or a low-alumina substantially alkali-free zeolite. In another aspect, the silica forming source can comprise a compound that forms free silica when heated, for example, silicic acid or a silicon organo-metallic compound. In still another aspect, the silica forming source can be a clay. To this end, a suitable clay can be either a calcined or raw clay, or a combination of calcined and raw clays. In one aspect, a suitable clay further comprises a kaolin. Examples of commercially available silica forming sources include, without limitation, Glomax calcined clay and K-10 raw clay available from Dry Branch Kaolin, Inc. of Dry Branch, Ga. and the Imsil A25 Silica available from, Laguna Clay Co., of Byesville, Ohio.

According to the invention, the plasticizable cordierite precursor batch composition can be prepared by first mixing the dispersible alumina source and the magnesium oxide source in a solvent to provide a slurry premix. In one aspect the slurry premix can have a solids loading in the range of from approximately 50 to approximately 60 percent by weight.

The solvent can be any liquid medium in which the both the magnesium oxide source and the dispersible alumina source can be at least substantially dispersed to provide a colloidal suspension or slurry. In one aspect, the solvent can be water.

The premix slurry comprised of the dispersible alumina forming source and the magnesium oxide forming source can then be at least substantially dried to at least substantially remove the solvent from the slurry premix and to provide a first dry premix. In various aspects, an at least substantially dry premix refers to slurry premix wherein at least greater than 80%, at least greater than 85%, at least greater than 90%, at least greater than 95% or even at least greater than 99% of the solvent has been removed. Any conventional method for removing the solvent from the slurry can be used, including and without limitation, conventional oven drying and/or spray drying. In one aspect, the slurry premix is at least substantially dried by spray drying the slurry.

After at least substantially drying the slurry premix, the at least one silica forming source can then be mixed together with the dry premix to provide a cordierite precursor batch composition comprised of at least one dispersible alumina source, at least one magnesium oxide source, and at least one silica source. It should also be understood that, one or more additional batch materials can be introduced into the dry premix in addition to the at least one silica forming source. For example, and without limitation, raw clay, calcined clay, talc, silica, alumina, boehmite, a porosity additive, or any mixture thereof can also be added to the dry premix. The aforementioned dry premix, at least one silica forming source and any optional batch materials can be combined in a dry mixing step sufficient to produce an intimate mixing and to provide a cordierite precursor batch composition that can undergo an at least substantially complete reaction during subsequent thermal processing.

The cordierite precursor batch composition can be mixed together with a binder system to form a plasticized cordierite precursor composition and to help create an extrudable mixture that is formable and/or moldable. In one aspect, the binder system for use in the present invention comprises a cellulose ether binder component selected from the group consisting of methylcellulose, methylcellulose derivatives, and combinations thereof, a surfactant component, preferably stearic acid or sodium stearate, and a solvent component, preferably comprising water. In one aspect, the binder system can comprises the following amounts, assuming 100 parts by weight of the cordierite precursor batch composition: about 0.2 to 2 parts by weight of sodium stearate, about 2.5 to 6.0 parts by weight of a methylcellulose or a hydroxypropyl methylcellulose binder, and about 20-50 parts by weight of the water.

The individual components of the binder system can be mixed together with the cordierite precursor batch composition in any suitable known manner to prepare an intimate mixture of the ceramic material and the binder system capable of being formed into a ceramic body by, for example, extrusion. For example, all components of the binder system may be previously mixed with each other, and the binder mixture can then be mixed together with the cordierite precursor batch composition. In this case, the entire portion of the binder system may be added at one time, or divided portions of the binder system may be added one after another at suitable intervals. Alternatively, the components of binder system may be added to the cordierite precursor batch composition one after another, or each previously prepared mixture of two or more components of the binder system may be added to the cordierite precursor batch composition. Further, the binder system may be first mixed with a portion of the cordierite precursor batch composition. In this case, the remaining portion of the cordierite precursor batch composition is subsequently added to the prepared mixture. In any case, the binder system must be uniformly mixed with the cordierite precursor batch composition in a predetermined portion. To this end, in one aspect, uniform mixing of the binder system and the cordierite precursor batch composition can be accomplished in a known kneading process.

The resulting stiff, uniform and extrudable plasticized cordierite precursor batch composition can then shaped into a green body by any known conventional ceramic forming process, such as, e.g. extrusion, injection molding, slip casting, centrifugal casting, pressure casting, dry pressing, and the like. For the preparation of a thin-walled honeycomb substrate suitable for use as a catalyst support, extrusion through a die is preferable.

The prepared ceramic green body can then be dried for a period of about 5-20 minutes prior to firing by any conventional method such as either hot-air or dielectric drying. The dried green body can thereafter be fired at a sufficient temperature for a sufficient time to result in a fired ceramic body containing cordierite as its primary phase. The firing conditions can vary depending on the process conditions such as specific composition, size of the green body, and nature of the equipment. To that end, the optimal firing conditions will be readily obtainable by one of ordinary skill in the art through no more than mere routine experimentation. However, in one aspect, the firing conditions can comprise heating the green body to a temperature of between about 1350° C. to about 1450° C. and holding at this temperature for about 6 hours to about 16 hours, and thereafter cooling the green body back to room temperature. In still another aspect, two exemplary and non-limiting heating profiles are set forth in Tables 3 and 4 below.

As described above the cordierite ceramic bodies, when formed as a honeycomb structure for example, by extrusion, are further characterized by their orientation of the cordierite crystallites as evidenced by their characteristic high transverse and low axial I-ratios. Specifically, in one aspect, the ceramic articles of the present invention can be characterized by a transverse I-ratio of at least about 0.88. In another aspect, the ceramic articles of the present invention can be characterized by a transverse I-ratio of at least about 0.91, at least about 0.92, at least 0.96 or even at least about 0.97. In another aspect, the ceramic articles of the present invention can be characterized by an axial I-ratio no greater than about 0.46. Alternatively, the ceramic articles can have an axial I-ratio no greater than about 0.42, no greater than about 0.39 or even no greater than about 0.24.

This I-ratio characteristic is measured through the use of an x-ray diffraction analysis of a section of the fired web of a cordierite honeycomb body. If the negative expansion c-axes of the crystallites comprising cordierite body are preferentially oriented in a particular direction, then the reflections measured from a slice cut normal to that direction should be more intense than if the crystallites were randomly oriented. At the same time, reflections that are diffracted from crystallographic planes parallel to the negative expansion c-axes should be less intense than when there is little or no orientation. The following ratio, the I-ratio ($I_R$), as first described in U.S. Pat. No. 3,885,977, is used to describe the degree of orientation:

$$I_R = \frac{I_{(110)}}{I_{(110)} + I_{(002)}}$$

where $I_{(110)}$ and $I_{(002)}$ are the peak heights of the X-ray reflections from the (110) and (002) crystallographic planes respectively, based on hexagonal cordierite crystal structure; these reflections correspond to d-spacings of about 4.9 Å and 4.68 Å, respectively.

The axial and transverse I-ratio refer to different orientations of a cordierite honeycomb sample in the x-ray beam. The x-ray beam impinges a planar surface at an angle. Referring specifically to the measurement of the transverse I-ratio, this measurement is taken on the planar surface of the sample when that planar surface on which the x-rays impinge is the flat surface made up of the as-formed wall surfaces of the honeycomb. Put differently, this measurement of the transverse I-ratio is performed by slicing the cordierite honeycomb substrate to expose a flat section of a web of the honeycomb and subjecting this web to X-ray diffraction and calculating the intensity of the observed diffraction peaks. If the obtained value is greater than 0.65, which is the I-ratio for a body of completely randomly oriented crystals (i.e., a powder), then it can be inferred that the cordierite crystallites have a preferred orientation; i.e., a majority of the cordierite crystallites are oriented with their c-axes in the plane of the web. An I-ratio of 1.00 would imply that all of the cordierite crystallites were oriented with their negative expansion axis within the plane of the web, and thus the closer the transverse I-ratio ($I_T$) is to a value of 1.00, the higher the degree of this planar orientation. Referring specifically now to the measurement of the axial I ratio, this measurement is taken on a plane which is perpendicular to the length of the cell channels (and, therefore, also perpendicular to that for a transverse I-ratio) where the planar surface on which the x-rays impinge consists of the cross-sectional ends of the honeycomb webs. Put differently, this X-ray measurement is performed on the surface of the cordierite honeycomb that is normal to the direction of extrusion. If the axial I-ratio ($I_A$) is less than 0.65 it can again be inferred that the cordierite crystallites exhibit a preferred orientation. Specifically, since the cordierite crystallites are preferentially oriented with their c-axes in the plane of the webs, the intensity of the reflections from the planes is expected to be greater than that for a body with completely randomly oriented cordierite crystallites.

Simply stated, if the I-ratio measured in the transverse direction with respect to the extrusion direction of the body exceeds about 0.65 or the axial I-ratio with respect to the extrusion direction is less than about 0.65, then the cordierite crystallites are becoming substantially oriented with their c-axes within plane of the webs.

It is well established that the coefficient of thermal expansion of cordierite cellular bodies in the axial direction (parallel to the cell channels) is affected by non-random crystallographic orientation of the cordierite crystals in the microstructure, by the degree of microcracking present in the body after firing, and by the presence of high-expansion extraneous phases. Typically, higher values of transverse I-ratio, and correspondingly lower values of axial I-ratio correlate with low values of thermal expansion measured axially. Essentially, this is due to the combined effect of the negative expansion direction of the cordierite crystallites being oriented in the plane of the webs coupled with the generation of microcracks forming from strains associated with thermal expansion anisotropy of large regions of oriented crystallites.

Accordingly, in another aspect, the ceramic articles of the present invention are characterized by having an ultra-law coefficient of thermal expansion (CTE) in the axial direction that is equal to or more negative than $-0.6 \times 10^{-7}/°$ C. across the temperature range of from 25° C. to 800° C. In another aspect, the ceramic article has a coefficient of thermal expansion (CTE) in the axial direction that is equal to or more negative than $-1.0 \times 10^{-7}/°$ C. across the temperature range of from 25° C. to 800° C. In still another aspect, the coefficient of thermal expansion (CTE) in the axial direction is in the range of from $-0.6 \times 10^{-7}/°$ C. to $-2.0 \times 10^{-7}/°$ C. across the temperature range of from 25° C. to 800° C. In still another aspect, the coefficient of thermal expansion (CTE) in the axial direction is in the range of from $-1.0 \times 10^{-7}/°$ C. to $-2.0 \times 10^{-7}/°$ C. across the temperature range of from 25° C. to 800° C.

A primary utility of the mixtures described herein is for preparing high strength cordierite honeycomb substrates useful as catalyst carriers. Although the invention is particularly advantageous for preparing thin-walled honeycombs, the claimed mixtures can also be used for thicker walled structures. Methods of applying catalysts to the honeycomb structures, and utilizing those structures, for example, in automobile exhaust systems, are well known in the art. The mixtures may also be useful for preparing other high strength cordierite structures, such as filters.

EXAMPLES

The following examples are put forth so as to provide those of ordinary skill in the art with a complete disclosure and description of how the ceramic articles and methods claimed herein are made and evaluated, and are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric.

For purposes of the foregoing examples, spray drying was performed by using a Mobile Minor 2000, manufactured by Niro, Inc. During the spray drying procedures, the slurry premix was pumped to the nozzle of the spray dryer using a pneumatic pump. The spray dryer nozzle had an outside diameter of 1.5 mm. The premix slurry material was sprayed from the bottom portion of the spray dryer. The inlet air temperature was kept at approximately 300° C. and the exhaust temperature was maintained by the feed rate of the material at approximately 105° C. For purposes of the foregoing examples, all slurry premixes were prepared using water as the solvent and in an amount sufficient to provide a solids loading in the range of from approximately 50% to 60% by weight.

Nine cordierite precursor batch compositions were prepared according to the formulation reported in Table 1. The batching procedures by which each of the nine cordierite precursor compositions were prepared are listed in Table 2.

TABLE 1

| Comp. | Talc A[1] | Talc B[2] | Dispersible Alumina A[3] | Dispersible Alumina B[4] | Clay A[5] | Clay B[6] | Silica[7] | Porosity Additive[8] |
|---|---|---|---|---|---|---|---|---|
| A | 39.9 (g) | — | 15.8 (g) | — | 28.4 (g) | 16.5 (g) | — | — |
| B | 39.9 (g) | — | 15.8 (g) | — | 28.4 (g) | 16.5 (g) | — | — |
| C | — | 39.9 (g) | 15.8 (g) | — | 28.4 (g) | 16.5 (g) | — | — |
| D | — | 39.9 (g) | 15.8 (g) | — | 42.6 (g) | — | — | — |
| E | — | 43.6 (g) | 43.4 (g) | — | — | — | 24.9 (g) | — |
| G | — | 43.9 (g) | 17.4 (g) | — | 47.1 (g) | — | — | — |
| F | — | 43.9 (g) | — | 13.9 (g) | 47.1 (g) | — | — | — |
| H | 39.9 (g) | — | 15.8 (g) | — | 28.4 (g) | 16.5 (g) | — | — |
| I | — | 43.6 (g) | 43.4 (g) | — | — | — | 24.9 (g) | 22.8 (g) |

[1]Artic Mist;
[2]96-67 Talc;
[3]Dispal 18N4 Boehmite;
[4]Alpha Alumina A1000;
[5]Glomax;
[6]K-10;
[7]Imsil Silica;
[8]Asbury Graphite 4740

TABLE 2

| Composition | Batching Procedures for Cordierite Precursor Compositions of Table 1 |
|---|---|
| A | A premix slurry was prepared containing all ingredients and the subsequent slurry was spray dried together. |
| B | A premix slurry was prepared containing the talc A and the dispersible alumina. The premix slurry was then spray dried to provide a spray dried premix and the remaining ingredients were mixed together with the spray dried premix. |
| C | A premix slurry was prepared containing the talc B and the dispersible alumina. The premix slurry was then spray dried to provide a spray dried premix and the remaining ingredients were mixed together with the spray dried premix. |
| D | A premix slurry was prepared containing the talc B and the dispersible alumina. The premix slurry was then spray dried to provide a spray dried premix and the remaining ingredients were mixed together with the spray dried premix. |
| E | A premix slurry was prepared containing the talc B and the dispersible alumina. The premix slurry was then spray dried to provide a spray dried premix and the remaining silica was mixed together with the spray dried premix. |
| G | A premix slurry was prepared containing the talc B and the Calcined clay. The premix slurry was then spray dried to provide a spray dried premix and the remaining dispersible alumina was dry mixed together with the spray dried premix. |
| F | A premix slurry was prepared containing the talc B and the Calcined clay. The premix slurry was then spray dried to provide a spray dried premix and the remaining dispersible alumina was dry mixed together with the spray dried premix. |
| H | Talc A and the dispersible alumina were dry mixed together. The remaining Calcined clay and raw clay were then dry mixed together with the talc A and dispersible alumina mixture. |
| I | A premix slurry was prepared containing Talc B and the dispersible alumina. The premix slurry was then spray dried to provide a spray dried premix. The remaining silica and graphite additive were dry mixed together with the spray dried premix. |

Plasticized cordierite precursor batch compositions were then prepared from the cordierite precursor positions reported in Table 1 by adding approximately 5 grams of Methocel F240 cellulose ester binder polymer and a sufficient amount of water to form an extrudable plasticized cordierite precursor batch composition. Green bodies of the extrudable compositions were then formed by extruding the plasticized compositions into several 200 cell per square inch, 19 mill thickness, honeycomb structures. The green bodies were then fired according to a 24 hour and/or 48 hour firing schedule as set forth in Tables 3 and 4 receptively. Selected properties of the various fired honeycomb green bodies are reporting in Table 5.

TABLE 3

(24 Hour Firing Schedule)

| Segment | Type | Temp.° C. | Time (hrs.) |
|---|---|---|---|
| 1 | Dwell | 25 | 0.1 |
| 2 | Rampt | 125 | 0.5 |
| 3 | Rampt | 400 | 2.0 |
| 4 | Rampt | 1400 | 7.0 |
| 5 | Dwell | 1400 | 8.0 |
| 6 | Rampt | 25 | 6.0 |
| 7 | End | | |

TABLE 4

(48 Hour Firing Schedule)

| Segment | Temp. ° C. | Time (hrs.) |
|---|---|---|
| 1 | 25-50 | 2 |
| 2 | 50-450 | 5.5 |
| 3 | 450-650 | 6 |
| 4 | 650-1400 | 5.3 |
| 5 | 1400-1405 | 11.5 |
| 6 | 1405 | 6 |
| 7 | 1405-850 | 6 |
| 8 | 850-25 | 5 |
| | Total | 47.3 |

As stated above, Table 5 reports various properties for the exemplary ceramics produced from the batch compositions reported in the Table 1, the batching procedures reported in Table 2 and the firing schedules reported in Tables 3 and/or 4. Properties included for certain of the ceramic bodies are the average coefficient of thermal expansion (CTE) of the ceramic article over the temperature range from about 25° C. to 800° C. ($\times 10^{-7}$/° C.) as measured by dilatometry; the volume percent open porosity; and the median pore diameter in μm, as measured by Hg porosimetry. Furthermore, Table 5 also includes for some examples, the transverse I-ratio, $I_T$, and, for some examples, the axial I-ratios, $I_A$, each as measured in the manner as described previously herein.

An examination of the results reported in Table 5 reveals that the particular batching procedure used to prepare the cordierite precursor composition, the choice of components within the batching composition, and the firing schedule can all affect the mean CTE for a given sintered phase cordierite composition. To this end, Examples, 2 through 9 and 13-14 represent exemplary sintered phase cordierite compositions manufactured in accordance with one or more methods of the present invention.

Example 2 demonstrates that selective mixing of the dispersible alumina (i.e., boehmite) and talc with a solvent to form a slurry premix then followed by subsequent spray drying of the slurry premix to remove the solvent can lead to a sintered phase cordierite composition having a negative mean CTE of approximately $-2.7 \times 10^{-7}$/° C. over the temperature range from about 25° C. to 800° C. Further, by comparing the results of Example 2 to the results of comparative Examples 1, 12, and 17 (each having identical precursor batch compositions), it can be seen that the batching process of Example 2 leads to a lower mean CTE than the batching procedures of Examples 1, 12 and 17, having mean CTE's of $1.2 \times 10^{-7}$/° C., $-0.1 \times 10^{-7}$/° C., and $0.0 \times 10^{-7}$/° C. respectively.

It should also be noted that a comparison of Examples 2 and 3 further demonstrates that in some instances the particular firing schedule or heating profile used to fire the green bodies can also impact the resulting CTE of a given sintered phase cordierite composition. For example, as demonstrated

TABLE 5

(Selected properties of several exemplary ceramic articles)

| Example | Composition | Firing Schedule | Mean CTE | Porosity | Mean Pore Size | $I_a$ | $I_T$ |
|---|---|---|---|---|---|---|---|
| 1 | A | 24 | 1.2 | 30.4% | 1.8 | 0.46 | 0.88 |
| 2 | B | 24 | −2.7 | 28.6% | 1.2 | 0.42 | 0.91 |
| 3 | B | 48 | 0 | 28.0% | 1.5 | — | — |
| 4 | C | 24 | 1.9 | 31.3% | 4.5 | — | — |
| 5 | D | 24 | −2.5 | 33.0% | 3.4 | — | — |
| 6 | D | 48 | 2.5 | 31.7% | 1.9 | — | — |
| 7 | C | 48 | 0.07 | 29.5% | 2.0 | — | — |
| 8 | E | 24 | 0 | 25.8% | 4.1 | — | — |
| 9 | E | 48 | −2.7 | 27.0% | 2.3 | 0.24 | 0.97 |
| 10 | F | 24 | 4.5 | 41.0% | 6.2 | — | — |
| 11 | G | 24 | −1.5 | 32.3% | 3.7 | 0.39 | 0.92 |
| 12 | H | 24 | −0.1 | 37.3% | 2.3 | — | — |
| 13 | I | 48 | −0.5 | 43.6% | 6.3 | — | — |
| 14 | I | 24 | 2.1 | 42.6% | 7.6 | — | — |
| 15 | F | 48 | 5.7 | 39.7% | 3.8 | — | — |
| 16 | G | 48 | 0 | 32.3% | 2.2 | — | — |
| 17 | H | 48 | 3.1 | 33.7% | 1.8 | — | — | by Example 2, the shorter and hence faster 24 hour firing schedule (e.g., 100 to 120° C. per hour) resulted in a relatively lower mean CTE than the longer and hence slower 48 hour firing schedule (e.g., 10 to 60° C. per hour), demonstrated by Example 3.

The properties reported for the sintered phase cordierite composition of Example 5 demonstrate another instance where the selective mixing of dispersible alumina (i.e., boehmite) and talc with a solvent to form a slurry premix then followed by the subsequent spray drying of the slurry premix to remove the solvent can lead to a sintered phase cordierite composition having an negative mean CTE. As reported, the sintered phase composition of Example 5 exhibits a mean CTE of approximately $-2.5 \times 10^{-7}/°$ C. Once again, it should also be noted that a comparison of Examples 5 and 6 demonstrates another instance where the firing schedule or profile used to fire the green bodies can impact the mean CTE of a given sintered phase cordierite composition. Similar to the comparison of Examples 2 and 3, in Examples 5 the shorter firing cycle (i.e., 24 hour firing schedule) resulted in a relatively lower mean CTE than the longer 48 hour firing schedule reported by Example 6.

A review of Example 9 reveals still another instance wherein the selective mixing of a dispersible alumina (i.e., boehmite) and talc with a solvent to form a slurry premix then followed by the subsequent spray drying of the slurry premix to remove the solvent can lead to a sintered phase cordierite composition having an negative mean CTE. As reported, the sintered phase composition of Example 9 exhibited a mean CTE of approximately $-2.5 \times 10^{-7}/°$ C.

However, in contrast to the mean CTE results for the Examples discussed above, a comparison of Examples 8 and 9 reveals that the longer firing schedule of Example 9 (i.e. 48 hour firing schedule) resulted in a lower mean CTE than did the shorter 24 hour firing schedule of Example 8. As one of skill in the art will appreciate, this result was to be expected in so far as the quartz associated with the Imsil Silica silica component used in the batch compositions of Examples 8 and 9 (and not present in the previously discussed Examples) would be expected to result in a slower rate of reaction during the firing process, therefore necessitating a longer firing schedule.

While not intending to be limited by theory, it is thought that the very low mean CTE's of the present inventive ceramic articles and obtainable by the methods of the present invention are due not only to an increase in the degree of preferred planar orientation of the cordierite crystallites, but also to an increased degree of microcracking. To this end, FIG. 1 illustrates an exemplary SEM micrograph of a spray dried premix slurry of talc and boehmite. As depicted, by selectively mixing the dispersible alumina (i.e., boehmite) and the magnesium oxide source (i.e., talc) the boehmite (gray phase) appears to coat the talc particles (bright platy phase). It is therefore believed that this close proximity of the boehmite and talc resulting from the spray drying process contributes to the ultra low mean coefficients of thermal expansion exhibited by the cordierite bodies of the instant invention.

It should also be understood that while the present invention has been described in detail with respect to certain illustrative and specific aspects thereof, it should not be considered limited to such, as numerous modifications are possible without departing from the broad spirit and scope of the present invention as defined in the appended claims.

What is claimed is:

1. A method for producing a ceramic article comprising a sintered phase cordierite composition, comprising the steps of:
   mixing a dispersible alumina source and a magnesium oxide source in a solvent to provide a slurry premix;
   substantially removing the solvent from the slurry premix to provide a first dry premix;
   mixing at least one silica source together with the first dry premix to provide a cordierite precursor batch composition;
   mixing the cordierite precursor batch composition together with a binder system to form a plasticized cordierite precursor composition;
   forming a green body from the plasticized cordierite precursor composition; and
   firing the green body for a period of time and at a temperature sufficient to provide a ceramic article comprising the sintered phase composition.

2. The method of claim 1, wherein the magnesium oxide source comprises talc, wherein the dispersible alumina source comprises boehmite, and wherein the solvent comprises water.

3. The method of claim 1, wherein the dispersible alumina source comprises from approximately 15 to approximately 45 percent by weight of the cordierite precursor batch composition.

4. The method of claim 1, wherein the sintered phase cordierite composition comprises at least about 93% by weight cordierite, consisting essentially of from about 49 to about 53 percent by weight $SiO_2$, from about 33 to about 38 percent by weight $Al_2O_3$, and from about 12 to about 16 percent by weight MgO, and wherein the sintered phase cordierite composition exhibits a coefficient of thermal expansion equal to or more negative than $-0.6 \times 10^{-7}/°$ C. across the temperature range of from 25° C. to 800° C.

5. The method of claim 4, wherein the sintered phase cordierite composition exhibits a coefficient of thermal expansion equal to or more negative than $-1.0 \times 10^{-7}/°$ C. over the temperature range of 25° C. to 800° C.

6. The method of claim 1, wherein the sintered phase cordierite composition exhibits a transverse I ratio of at least 0.91.

7. The method of claim 1, wherein the sintered phase cordierite composition exhibits a transverse I ratio of at least 0.96.

8. The method of claim 1, wherein the solvent is removed from the slurry premix by spray drying.

9. The method of claim 1, wherein the ceramic article comprises a honeycomb configuration.

10. The method of claim 1, wherein step of mixing at least one silica source together with the first dry premix to provide a cordierite precursor batch composition further comprises mixing at least one additional inorganic batch material with the first dry premix, and wherein the at least one additional inorganic batch material comprises raw clay, calcined clay, talc, silica, alumina, boehmite, or a mixture thereof.

* * * * *